United States Patent
Lin et al.

(10) Patent No.: US 8,249,053 B2
(45) Date of Patent: Aug. 21, 2012

(54) VOICE COMMUNICATION SYSTEM

(75) Inventors: Ming-Lih Lin, Taipei (TW);
Wen-Cheng Shih, Hsin Chu (TW);
Ting-Chien Kuo, Taipei (TW)

(73) Assignee: Realtek Semiconductor Corp., Hsinchu (TW)

( * ) Notice: Subject to any disclaimer, the term of this patent is extended or adjusted under 35 U.S.C. 154(b) by 1561 days.

(21) Appl. No.: 11/716,566

(22) Filed: Mar. 12, 2007

(65) Prior Publication Data
US 2008/0049913 A1 Feb. 28, 2008

(30) Foreign Application Priority Data

Aug. 25, 2006 (TW) .............................. 95131248 A (51) Int. Cl.
*H04L 12/66* (2006.01)
(52) U.S. Cl. ........................................ 370/352; 370/354
(58) Field of Classification Search ........................ None
See application file for complete search history.

(56) References Cited

U.S. PATENT DOCUMENTS

| 6,804,244 B1 | 10/2004 | Anandakumar et al. | |
| 2006/0023700 A1 | 2/2006 | Usuba et al. | |
| 2006/0029086 A1* | 2/2006 | Akie et al. | 370/401 |
| 2006/0187900 A1* | 8/2006 | Akbar | 370/352 |

FOREIGN PATENT DOCUMENTS

| CN | 1512745 A | 7/2004 |
| JP | 08-032652 | 2/1996 |
| JP | 2001-313687 | 11/2001 |
| JP | 2004-215209 | 7/2004 |

OTHER PUBLICATIONS

Skype Community, "Controlling Skype Using DTMF Signals on Mic. Input", Oct. 2005, Web Address: http://forum.skype.com/index.php?showtopic=37520, all pages pertinant.*

* cited by examiner

*Primary Examiner* — Otis L Thompson, Jr.
(74) *Attorney, Agent, or Firm* — Muncy, Geissler, Olds & Lowe, PLLC (57) ABSTRACT

A voice communication system for achieving a public switch telephone network (PSTN) communication and an internet communication is provided. The system comprises a host, a control device and a telephone. The invention features advantages of both the PSTN and the internet, and further covers the natural shortcomings of each other.

37 Claims, 5 Drawing Sheets

VOICE COMMUNICATION SYSTEM

BACKGROUND OF THE INVENTION

1. Field of the invention

The invention relates generally to voice communication systems, and more specifically to a voice communication system using a personal computer for achieving a public switch telephone network (PSTN) communication and an internet communication.

2. Description of the Related Art

The telephone is a very important communication tool that most people are comfortable with. Currently, telephones generally are divided into PSTN-based phones and telephones compliant with a voice over internet protocol (hereinafter described as "VOIP-based phones"). It will be a great convenience to using telephones if PSTN-based phones and VOIP-based phones are integrated.

SUMMARY OF THE INVENTION

In view of the above-mentioned problems, an object of the invention is to provide a voice communication system.

Another object of the invention is to provide a communication control device for achieving a PSTN communication and an internet communication.

In one embodiment, the voice communication system comprises: a host, for executing an operating system and an internet communication program to carry out the internet communication; a communication control device coupled to the host, for achieving the internet communication and the PSTN communication; and, a telephone coupled to the communication control device 130, for placing or receiving VOIP-based calls or PSTN-based calls via the communication control device.

In another embodiment, the host comprises: a processing module for performing data processing; a storage module coupled to the processing module for providing data access; a network control circuit coupled to the processing module and the internet for controlling sending and receiving network packets; and, an audio circuit coupled to the processing module for performing sending and receiving operations of audio data.

In a further embodiment, the communication control device comprises: an interface circuit coupled to the host for providing a signal with a specified voltage level according to audio data generated by the host; a switching circuit coupled to the interface circuit, a PSTN interface and a telephone interface, for coupling the telephone interface with one of the interface circuit and the PSTN interface according to a switching signal generated by the host; a detecting circuit coupled to a telephone line located between the host and the PSTN interface for detecting the state of the PSTN line and outputting a detecting result to the host; a filter coupled to a telephone line located between the audio circuit and the telephone interface.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The voice communication system of the invention will be described with reference to the accompanying drawings.

Figure 1:
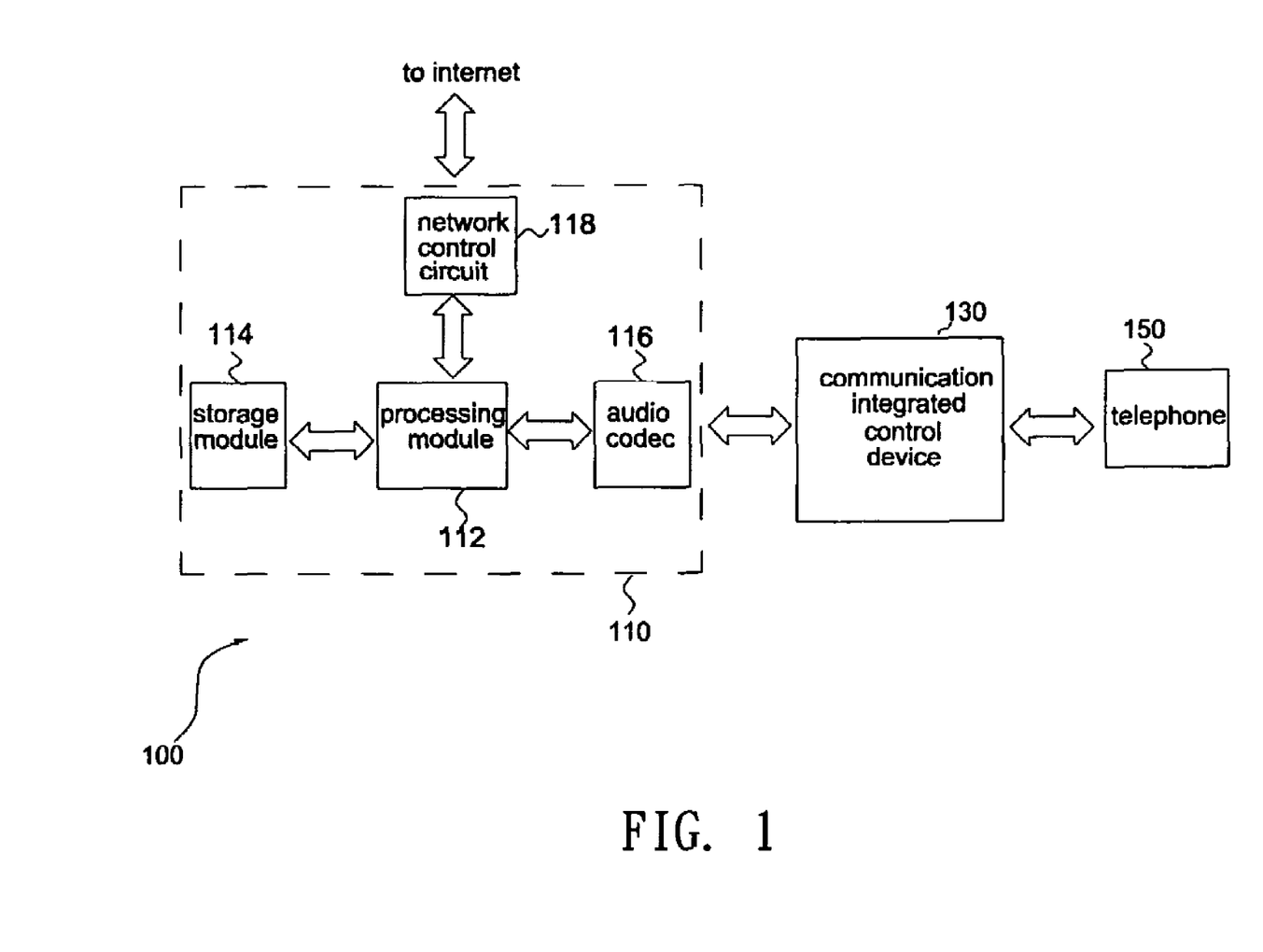
FIG. 1 shows a block diagram of a voice communication system according to a first embodiment of the invention.

FIG. 1 shows a block diagram of a voice communication system according to a first embodiment of the invention. Referring to FIG. 1, a voice communication system 100 according to the invention includes: a host 110, for establishing an internet communication, wherein the host could be a desktop computer, a notebook, a tablet personal computer (PC), a personal digital assistant and a cellular phone; a communication control device 130, for achieving the internet communication and the PSTN communication, wherein the communication control device 130 could be built inside the host 110, or be a external device to the host 110; a telephone 150 coupled to the communication control device 130, for placing or receiving VOIP-based calls or PSTN-based calls. In an alternative embodiment of the invention, the host 110 further comprises a housing (not shown) and the communication control device 130 is set in the housing.

Referring also to FIG. 1, the host 110 includes a processing module 112 for performing data processing, wherein the processing module 112 includes a processor and a chipset (not shown) (comprising a south-bridge chip and a north-bridge chip (a south-bridge 210 shown in FIG. 2)), and wherein the implementation of the processor and the chipset is well known to those skilled in the art and therefore will not be described herein; a storage module 114 coupled to the processing module for providing data access, wherein the storage module 114 according to this embodiment includes a non-volatile storage unit (such as hard disk) and a volatile storage unit (such as a dynamic random access memory) (not shown), and wherein the implementation of the storage module 114 is also well known to those skilled in the art and thus will not be described herein; a network control circuit 118 coupled to the processing module 112 and the internet, for controlling sending and receiving network packets, wherein the storage module 114 could be a stand-along network interface card, or a network chip integrated into the chipset embedded in the processing module 112, and wherein the implementation of the network control circuit 118 is also well known to those skilled in the art and thus will not be described herein; an audio codec 116 coupled to the processing module 112, for performing sending and receiving operations of audio data, wherein the audio codec 116 could be a stand-along audio card, or an audio chip integrated into the chipset embedded in the processing module 112. In the first embodiment, the storage module 114, the network control circuit 118 and the audio codec 116 are coupled to the chipset (not shown) in the processing module 112. Besides, the network control circuit 118 and the audio codec 116 are integrated into the chipset. Further, the host 110 has a network interface (such as a RJ-45 interface) (not shown) through which the network control circuit 118 is coupled to an internet line.

Figure 2:
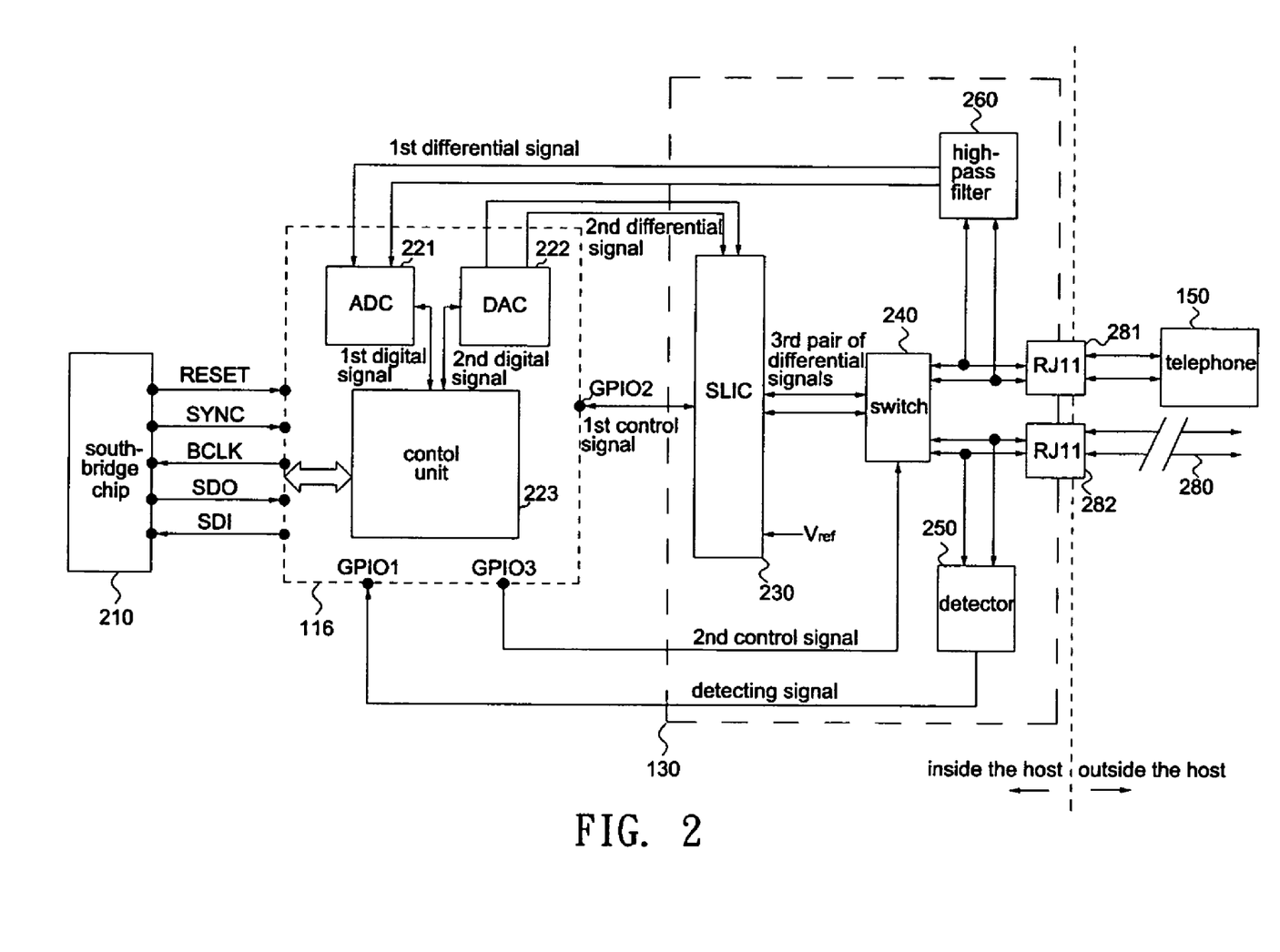
FIG. 2 shows a detailed diagram of a portion of the first embodiment.

FIG. 2 shows a detailed diagram of a portion of the first embodiment. As shown in FIG. 2, the communication control device 130 of this embodiment includes: a high-pass filter 260 for filtering low-frequency signals that the telephone 150 transmits and generating a first differential signal; a subscriber line interface circuit (SLIC) 230 for providing a third differential signal with a specified voltage level according to a first control signal and a second differential signal output from the audio codec 116; a detector 250 for detecting the state of a PSTN line 280 and generating a detecting signal; a switch 240 for connecting the telephone 150 with the internet via the host 110, or coupling the telephone 150 with the PSTN line 280 according to a second control signal output from the audio codec 116; two RJ-11 interfaces 281, 282 coupled to the telephone 150 and the PSTN line 280 respectively.

Referring also to FIG. 2, two RJ-11 interfaces 281, 282 of the host 110 are coupled to the telephone 150 and the PSTN line 280 respectively. And, the high-pass filter 260, coupled to a telephone line (consisting of a tip wire and a ring wire) located between the interface 281 and the switch 240, filters low-frequency ring signals and generates a first differential signal. The detector 250 detects the state of the PSTN line 280, e.g., the voltage variations on the PSTN line 280, to generate a detecting signal. There are three typical states on the conventional PSTN line 280. They are an on-hook state, an off-hook and a ring state. The voltages on the PSTN line 280 vary with different states. Since the states and the variations on the PSTN line 280 are well known, the description is omitted herein. The first terminal of the switch 240 is connected to the telephone 150 and the high-pass filter 260 and its second terminal receives the third differential signal, with its third terminal connected to the PSTN line 280. According to the second control signal, the switch 240 couples the telephone 150 with the internet via the host 110, or with the PSTN line 280.

Referring also to FIG. 2, both of the south-bridge chip 210 and the audio codec 116 are mounted on a motherboard (such as a computer motherboard) in this embodiment. An analog-to digital converter 221 embedded in the audio codec 116 receives and converts the first differential signal into a first digital signal. In general, the first digital signal includes voice data and/or keypress data. With respect to voice data, they are sent from a control unit 223 (e.g., a DSP, a MPU or a logic circuit etc.) to the south-bridge chip 210 via a high definition audio interface, and then processed using the hardware and the software of the host 110. For example, while transmitted via the internet to a remote device, the voice data will be first processed using a VOIP-compliant program (such as a SKYPE program) which resides in and is executed on the host 110, and then be delivered to the remote device via the internet. On the contrary, while receiving the voice data from the remote device via the internet, the host 110 processes the voice data using the VOIP-compliant program and then transmits the voice data to the audio codec 116 via the south-bridge chip 210 and the high definition audio interface. Next, the audio codec 116 receives a second digital signal and then a digital-to-analog converter 222 converts the second digital signal into the analog second differential signal for output to the subscriber line interface circuit 230. Meanwhile, the control unit 223 outputs a first control signal to the subscriber line interface circuit 230 for causing the subscriber line interface circuit 230 to generate a third differential signal responsive to the second differential signal.

As previously described, the operating voltages of the motherboard and the telephone are generally different, i.e., the voltage level of signals transmitted on the motherboard different from the voltage level of signals transmitted by the telephone. The operating voltage of the motherboard is about 3-5V, whereas the operating voltage of the telephone is about (−5)-(−50)V. Therefore, the subscriber line interface circuit 230 mainly performs conversions between two different operating voltages. In this embodiment, the subscriber line interface circuit 230 converts the reference voltage $V_{ref}$ into different DC voltage levels so as to convert the second differential signal into the third differential signal compliant with the telephone signaling form after receiving the enabled first control signal. Subsequently, the switch 240 receives and then outputs the third differential signal to the telephone 150 via the interface 281.

On the other hand, if the first digital signal contains the keypress data generated by using the telephone 150, the control unit 223 decodes the first digital signal to obtain the keypress data according to a dual tone multiple frequency telephone signaling standard. In the case where the keypress data are a telephone number that a user dials to place an outgoing phone call, the control unit 223 transmits the telephone number to the host 110 so that the host 110 processes this telephone number using a VOIP-compliant program (such as SKYPE program). In addition, the control unit 223 can accordingly emulate a dial tone, a dialing keypad tone, a ring tone or a busy tone, and then return it to the telephone 150 through the digital-to-analog converter 222, the subscriber line interface circuit 230, the switch 240 and the interface 281. Furthermore, the user is allowed to remotely control the VOIP-compliant program from the keypad on the telephone handset if the above-mentioned keypress data correspond to a predetermined data, e.g., the keypress data equal to "##". For example, numeral keys "2", "8", "4", "6", "5 or #" on the keypad are employed to remotely control the cursor on the operating interface of the VOIP-compliant program for different directions and operations, such as "↑", "↓", "←", "→" and "enter". For the case where the keypress data correspond to another predetermined data, e.g., the keypress data equal to "", the control unit 223 outputs the second control data to configure the switch 240 via GPIO3 to perform a mode switch between the internet and the PSTN line, i.e., the switch 240 being configured to couple the telephone 150 with either the PSTN line 280 or the subscriber line interface circuit 230**.

Figure 3:
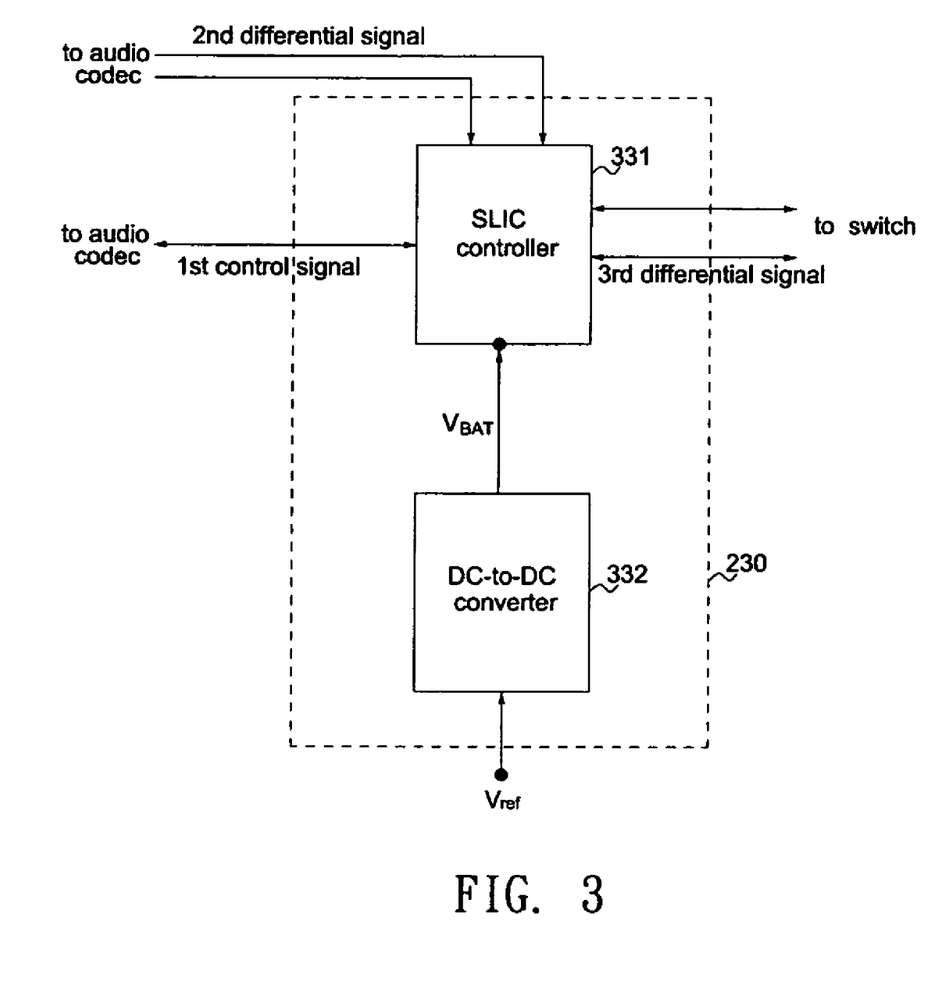
FIG. 3 shows a detailed diagram of the subscriber line interface circuit.

FIG. 3 shows a detailed diagram of the subscriber line interface circuit. Recall that the subscriber line interface circuit 230 mainly performs conversions between two different operating voltages. Referring to FIG. 3, the subscriber line interface circuit (SLIC) 230 includes a SLIC controller 331 and a DC-to-DC converter 332. The DC-to-DC converter 332 converts the reference voltage level $V_{ref}$ into another DC voltage level $V_{BAT}$ which is adapted to generate the DC voltage level of two signals Tip, Ring on the PSTN line. The DC voltage level is about (−5)-(−50)V. According to this embodiment, the reference voltage $V_{ref}$ is about 12V and the DC voltage level $V_{BAT}$ is about −90V. The audio codec 116 controls the SLIC controller 331 using the first control signal. If the first control signal is enabled, the SLIC controller 331 converts the second differential signal into a signal compliant with a telephone signaling form using the DC voltage level $V_{BAT}$ provided by the DC-to-DC converter 332.

Referring now to FIG. 1 and FIG. 2, in an alternative embodiment of the invention, the audio codec 116 doesn't analyze and process the first differential signal, but passes the data contained in the first differential signal to both the hardware and the software of the host 110 for processing via the south-bridge chip 210. For example, the host 110 analyzes the data contained in the first differential signal using at least a pre-loaded program (such as a VOIP-compliant program, or a software program capable of performing an analysis according to a dual tone multiple frequency signaling standard). If the analysis indicates that the data contained in the first differential signal are voice data intended for a remote device, the host 110 will send the data contained in the first differential signal to the remote device via the south-bridge chip 210, the network control circuit 118 and the internet. However, if the analysis indicates that the data contained in the first differential signal are keypress data, the host 110 will place a VOIP-based phone call according to the keypress data, or return signals to the communication control device 130.

Figure 4A:
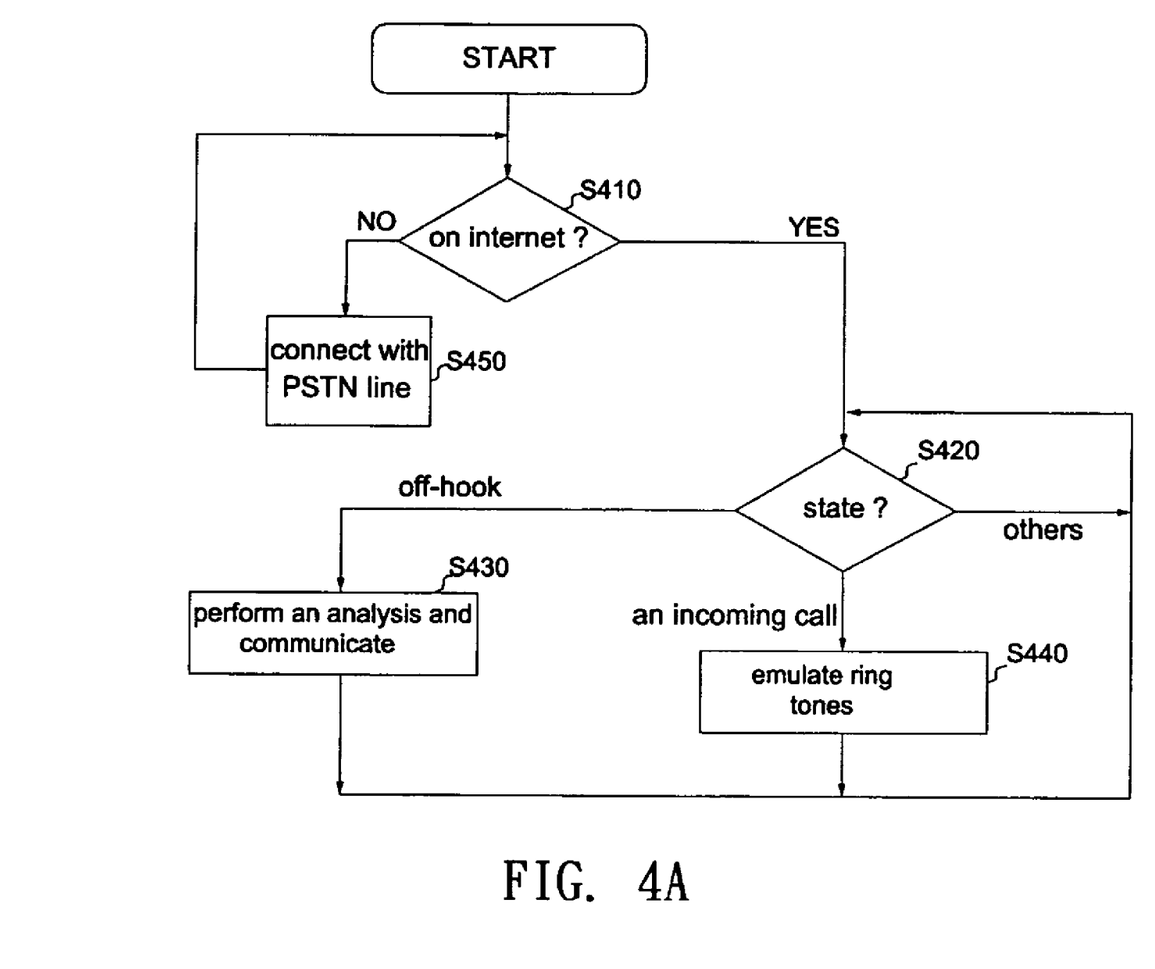
FIG. 4A is a flow chart illustrating a voice communication method according to the invention.

FIG. 4A is a flow chart illustrating a voice communication method according to the invention. In accordance with FIGS. 1, 2 and 4A, the voice communication method is detailed as follows.

Step S410: Determine if the host 110 is on the internet. If "YES" and the PSTN line has been in a on-hook state for a pre-determined period, the connection between the telephone 150 and the internet is thereafter initiated and the flow goes to the step S420; if "NO", the flow goes to the step S450. Note that other pre-determined conditions could be included to accordingly determine whether the connection between the telephone 150 and the internet needs to be initiated or not in an alternative embodiment of the step S410.

Step S420: Determine which state the PSTN line 280 is in. If the telephone handset is lifted, the flow advances to the step S430 with respect to the detecting signal generated by the detector 250. On the other hand, if there is an incoming PSTN-based phone call, the flow goes to the step S440. Apart from two above-mentioned conditions, the flow returns to the step S420 repeatedly if the host 110 maintains communication with the internet. In this embodiment, the step S420 may also determine if the host 110 is disconnected from the internet. If so, the flow returns to the step S410.

Step S430: An analysis of keypress data is performed and the communication is in progress. Then, the flow returns to the step S420.

Step S440: If the telephone 150 is on hook (i.e. the handset in the cradle), the control unit 223 generates a second digital signal with a ring tone and then the digital-to-analog converter 222 converts the second digital signal into an analog second differential signal. Next, the SLIC 230 converts the second differential signal into the third the differential signal compliant with the telephone signaling form. Finally, the third differential signal rings the bell in the telephone 150 via the switch 240. On the other hand, if the telephone 150 is in use, i.e., off hook, the operations of the step S440 will be performed as follows. The control unit 223 generates a second digital signal with a notifying tone and then the digital-to-analog converter 222 converts the second digital signal into an analog second differential signal. Next, the SLIC 230 converts the second differential signal into the third differential signal compliant with the telephone signaling form. Finally, the third differential signal is applied to the handset (the loudspeaker) in the telephone 150 via the switch 240 so as to notify the user of the incoming call. Then, the flow returns to the step S420.

Step S450: Establish or maintain the connection between the telephone 150 and the PSTN line 280 if the host 110 is not on the internet. Then, the flow returns to the step S410. In this step, while the telephone 150 attempts to connect with the PSTN line 280, the control unit 223 is employed to invert the second control signal and then transmit the inverted second control signal to the switch 240 via GPIO3 so as to control the connection between the telephone 150 and the PSTN line 280.

Figure 4B:
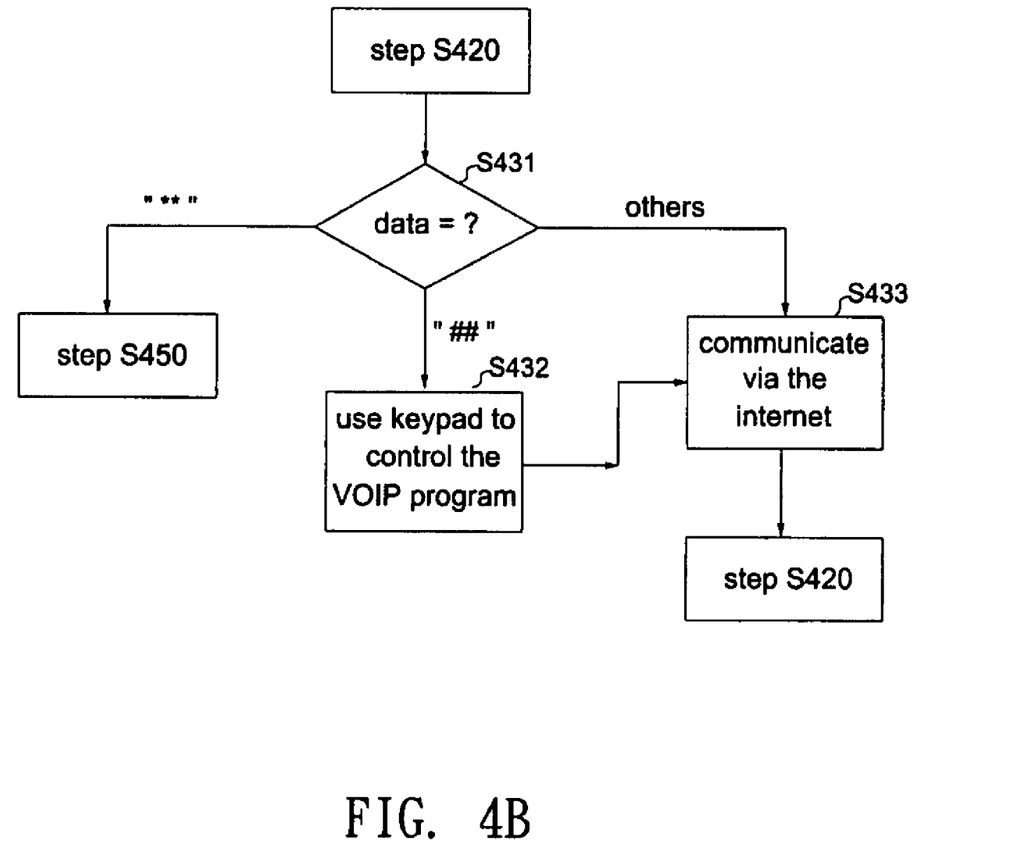
FIG. 4B is a flow chart illustrating a step of analyzing and communicating of FIG. 4A.

FIG. 4B is a flow chart illustrating a step of analyzing and communicating of FIG. 4A. In accordance with FIGS. 1, 2, 4A and 4B, the step S430 of analyzing and communicating is detailed as follows.

Step S431: First, the analog-to-digital 221 converts the analog first differential signal into the first digital signal. Next, according to a telephone signaling standard, the control unit 223 decodes the first digital signal and then analyzes what the first digital signal contains. If the first digital signal contains a first predetermined data, such as "##", the flow will go to the step S432. If the first digital signal contains a second predetermined data, such as "", the flow will go to the step S450. This often occurs when the user is notified of an incoming PSTN-based phone call and then makes a mode switch to the PSTN for answering. Otherwise, the flow will go to step S433. In an alternative embodiment, more conditions can be added in the step S431** and a corresponding operation is thus performed if the first digital signal satisfies one of the conditions.

Step S432: If the keypress data contained in first digital signal are "##", it indicates that the user attempts to remotely control the operating interface of the VOIP-compliant program using the keypad on the telephone handset. For example, the user employs the numeral keys "2", "8", "4", "6", "5 or #" on the keypad to remotely control the cursor on the operating interface of the VOIP-compliant program for different directions and operations, like "↑", "↓", "←", "→" and "enter". Afterward, the control unit 223 sends the subsequent keypress data representing different directions via the south-bridge chip 210 to the host 110. Accordingly, the host 110 processes the keypress data using the VOIP-compliant program. Then, the flow advances to the step S433.

Step S433: If the keypress data contained in first digital signal are a telephone number, the telephone number will be provided to the host 110 via the south-bridge chip 210. Thereafter, the host 110 places an outgoing VOIP-based phone call using the VOIP-compliant program in an internet-to-PSTN mode (such as SKYPE OUT). Likewise, if the keypress data contained in first digital signal represent one of VOIP phone users, the keypress data will be provided to the host 110 via the south-bridge chip 210. The host 110 then places an outgoing VOIP-based phone call using the VOIP-compliant program in an internet-to-internet mode (i.e. a peer-to-peer mode). Further, after communication is initiated, the voice data contained in the first digital signal are sent to the internet via the VOIP-compliant program that is executed on the host 110. On the other hand, the voice data from the internet are provided to the telephone 150 via the communication control circuit 130 by the host 110 using the VOIP-compliant program. Note that the flow returns to the step S420 after the analysis and/or communication is terminated in this step.

FIGS. 4A and 4B disclosed above are illustrative only, as each step can be modified or combined with other steps without departing from the spirit of the invention.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A voice communication system for coupling with a telephone and achieving a PSTN communication and an internet communication, comprising:

a host for executing an operating system and an internet communication program to carry out the internet communication, comprising:
  a processing module for performing data processing;
  a storage module coupled to the processing module for providing data access;
  a network control circuit coupled to the processing module and the internet for controlling sending and receiving network packets; and
  an audio circuit coupled to the processing module for performing sending and receiving operations of audio data;
a communication control device coupled to the host, comprising:
  an interface circuit coupled to the audio circuit for providing a specified voltage level suitable for the telephone according to audio data generated by the audio circuit; and
    a switching circuit coupled to the interface circuit, a PSTN interface and a telephone interface, for coupling the telephone interface with one of the interface circuit and the PSTN interface according to a switching signal generated by the host;
    wherein the audio circuit converts a first analog signal from the telephone via the telephone interface into a first digital signal and decodes the digital signal to obtain a keypress data according to a dual tone multiple frequency signaling standard;
    wherein when the keypress data correspond to a first predetermined data, a keypad of the telephone is allowed to remotely control cursor directions on an operating interface of the internet communication program compliant with a voice over internet protocol (VOIP) to thereby operate the internet communication program; and
    wherein characters on the keypad of the telephone correspond to different cursor directions and at least one operation of the cursor of the internet communication program.

2. The system of claim 1, wherein the host is one of a personal computer (PC) and a portable electronic device.

3. The system of claim 2, wherein the portable electronic device is selected from a group comprising a notebook, a tablet PC, a personal digital assistant and a cellular phone.

4. The system of claim 1, wherein the processing module comprises:
  a processor for processing data and
  a chipset coupled to the processor, the storage module, the network control circuit and the audio circuit.

5. The system of claim 1, wherein the interface circuit comprises a voltage level converter for utilizing a first voltage level generated by the host to provide the specified voltage level of the signal.

6. The system of claim 1, wherein the telephone interface is used to couple with a telephone and the PSTN interface is used to couple with a PSTN line.

7. The system of claim 6, wherein each of the telephone interface and the PSTN interface comprises a RJ-11 interface.

8. The system, of claim 6, wherein the specified voltage level of the signal is suitable for the telephone.

9. The system of claim 1, wherein the specified voltage level of the signal is different from a voltage level of the audio data.

10. The system of claim 1, wherein the host further comprises a housing and the control device is set in the housing.

11. The system of claim 1, wherein the control device is integrated with the host or serves as an external device to the host.

12. The system of claim 1, wherein the communication control device further comprises:
  a detecting circuit coupled to a telephone line located between the host and the PSTN interface for detecting the state of the PSTN line and outputting a detecting result to the host.

13. The system of claim 1, wherein the communication control device further comprises:
  a filter coupled to a telephone line located between the audio circuit and the telephone interface.

14. The system of claim 13, wherein the filter is a high-pass filter.

15. The system of claim 1, wherein the audio circuit comprises:
  an analog-to-digital converter coupled to the telephone interface for converting the first analog signal via the telephone interface into the first digital signal;
  a control unit coupled to the analog-to-digital converter and the processing module, for generating a first digital data to the processing module based on the first digital signal and for outputting a second digital signal based on a second digital data provided by the processing module; and
  a digital-to-analog converter coupled to the control unit and the interface circuit, for converting the second digital signal into a second analog signal and delivering the second analog signal to the interface circuit, wherein the interface circuit provides the signal with the specified voltage level according to the second analog signal.

16. The system of claim 15, wherein the control unit decodes the first digital signal to obtain the keypress data of the first digital data and sends the keypress data to the processing module; and wherein the keypress data are generated by using the keypad of the telephone.

17. The system of claim 1, wherein the host further comprises a RJ 45 interface and thereby the network control circuit coupled to the internet via the RJ 45 interface.

18. The system of claim 1, wherein when the keypress data correspond to a second predetermined data other than a telephone number of a called party, the telephone interface is switched from being connected with the interface circuit to being connected with the PSTN interface by the switching circuit according to the switching signal.

19. The system of claim 1, wherein the first predetermined data is other than a telephone number of a called party.

20. A communication control device for achieving a PSTN communication and an internet communication, wherein the PSTN communication is implemented using a telephone and the internet communication is implemented using a host that executes an operating system and an internet communication program, the communication control device comprising:
  an interface circuit coupled to the host for providing a signal with a specified voltage level according to audio data generated by the host; and
  a switching circuit coupled to the interface circuit, a PSTN interface and a telephone interface, for coupling the telephone interface with one of the interface circuit and the PSTN interface according to a switching signal generated by the host;
    wherein the specified voltage level of the signal is suitable for the telephone and different from a voltage level of the audio data;
    wherein the host decodes a signal from the telephone via the telephone interface to obtain a keypress data according to a dual tone multiple frequency signaling standard;

wherein when the keypress data correspond to a predetermined data, a keypad of the telephone is allowed to remotely control at least one of cursor directions on an operating interface of the internet communication program compliant with a voice over internet protocol (VOIP) to thereby operate the internet communication program; and wherein characters on the keypad of the telephone correspond to different cursor directions and at least one operation of the cursor of the internet communication program.

21. The device of claim 20, wherein the host is one of a personal computer and a portable electronic device.

22. The device of claim 21, wherein the portable electronic device is selected from a group comprising a notebook, a tablet PC, a personal digital assistant and a cellular phone.

23. The device of claim 20, wherein the host comprises:
a processing module for performing data processing;
a storage module coupled to the processing module for providing data access;
a network control circuit coupled to the processing module and the internet for controlling sending and receiving network packets; and
an audio circuit coupled to the processing module for performing sending and receiving operations of the audio data.

24. The device of claim 23, wherein the audio circuit comprises:
an analog-to-digital converter coupled to the telephone interface for converting a first analog signal from the telephone interface into a first digital signal;
a control unit coupled to the analog-to-digital converter and the processing module, for providing a first digital data to the processing module based on the first digital signal and generating a second digital signal based on a second digital data output from the processing module; and
a digital-to-analog converter coupled to the control unit and the interface circuit, for converting the second digital signal into a second analog signal and delivering the second analog signal to the interface circuit, wherein the interface provides the signal with the specified voltage level according to the second analog signal.

25. The device of claim 24, wherein the control unit decodes the first digital signal to obtain the keypress data of the first digital data and sends the first digital data containing the keypress data to the processing module; and, wherein the keypress data are generated by using the keypad of the telephone.

26. The device of claim 24, wherein the processing module decodes the first digital data to obtain the keypress data.

27. The device of claim 24, wherein the host further comprises a RJ-45 interface such that the network control circuit is coupled to the internet via the RJ 45 interface.

28. The device of claim 20, wherein the interface circuit is a subscriber line interface circuit.

29. The device of claim 20, wherein the interface circuit comprises a voltage level converter for utilizing a first voltage level generated by the host to provide the specified voltage level of the signal.

30. The device of claim 20, wherein the telephone interface is adapted to couple with a telephone and the PSTN interface is adapted to couple with the PSTN line.

31. The device of claim 20, wherein each of the telephone interface and the PSTN interface comprises a RJ-11 interface.

32. The device of claim 20, wherein the communication control device is integrated with the host or serves as an external device to the host.

33. The device of claim 20, further comprising:
a detecting circuit coupled to a telephone line located between the host and the PSTN interface for detecting the state of the PSTN line and outputting a detecting result to the host.

34. The device of claim 20, further comprising:
a filter for filtering the signal that the telephone interface transmits.

35. The device of claim 34, wherein the filter is a high-pass filter.

36. The device of claim 20, wherein the predetermined data is other than a telephone number of a called party.

37. A communication control device for achieving a PSTN communication and an internet communication, wherein the PSTN communication is implemented using a telephone and the internet communication is implemented using a host that executes an operating system and an internet communication program, the communication control device comprising:
an interface circuit coupled to the host for providing a signal with a specified voltage level according to audio data generated by the host; and
a switching circuit coupled to the interface circuit, a PSTN interface and a telephone interface, for coupling the telephone interface with one of the interface circuit and the PSTN interface according to a switching signal generated by the host;
wherein the specified voltage level of the signal is suitable for the telephone and different from a voltage level of the audio data;
wherein the host decodes a signal from the telephone via the telephone interface to obtain a keypress data according to a dual tone multiple frequency signaling standard;
wherein when the keypress data correspond to a first predetermined data, the telephone interface is switched from being connected with the interface circuit to being connected with the PSTN interface by the switching circuit according to the switching signal;
wherein when the keypress data correspond to a second predetermined data, a keypad of the telephone is allowed to remotely control cursor directions on an operating interface of the internet communication program compliant with a voice over internet protocol (VOIP) to thereby operate the internet communication program;
wherein characters on the keypad of the telephone correspond to different cursor directions and at least one operation of the cursor of the internet communication program; and
wherein the first predetermined data and the second predetermined data are not a telephone number of a called party.

* * * * *